(12) United States Patent
Mannon et al.

(10) Patent No.: US 6,675,569 B2
(45) Date of Patent: Jan. 13, 2004

(54) MOWER BLADE

(75) Inventors: N. Kevin Mannon, Overland Park, KS (US); Paul T. Voss, Independence, MO (US)

(73) Assignee: Frederick Manufacturing Corporation, Kansas City, MO (US)

( * ) Notice: Subject to any disclaimer, the term of this patent is extended or adjusted under 35 U.S.C. 154(b) by 0 days.

(21) Appl. No.: 10/142,246

(22) Filed: May 8, 2002

(65) Prior Publication Data

US 2003/0209000 A1 Nov. 13, 2003

(51) Int. Cl.[7] ............................................. A01D 34/63
(52) U.S. Cl. ......................................................... 56/295
(58) Field of Search ........................... 56/255, 295, 17.5, 56/503, DIG. 17, DIG. 20

(56) References Cited

U.S. PATENT DOCUMENTS

| | | | | |
|---|---|---|---|---|
| 3,538,692 A | * | 11/1970 | Cope et al. ................... | 56/295 |
| 3,998,037 A | * | 12/1976 | Deans et al. .................. | 56/295 |
| 4,205,512 A | * | 6/1980 | Thorud ........................ | 56/13.4 |
| 4,269,020 A | * | 5/1981 | Wolf ............................. | 56/295 |
| 5,291,725 A | | 3/1994 | Meinerding | |
| 5,353,581 A | * | 10/1994 | Rouse et al. .................. | 56/255 |
| 5,581,987 A | * | 12/1996 | Schuyler ...................... | 56/255 |
| 5,615,542 A | * | 4/1997 | Thorud et al. ................ | 56/255 |
| 5,619,846 A | * | 4/1997 | Brown ......................... | 56/255 |
| 6,487,840 B1 | * | 12/2002 | Turner et al. ................. | 56/295 |

* cited by examiner

Primary Examiner—Robert E. Pezzuto
(74) Attorney, Agent, or Firm—Robert L. Harrington; Schwabe Williamson & Wyatt

(57) ABSTRACT

A blade for mounting to a rotary mower. The blade has a beveled cutting leading edge and a trailing edge. The mower has a deck providing an over cover for the blade. The trailing edge of the blade is provided with an upwardly directed ramp at the outermost end of the trailing edge and deflects air flow upwardly inside the deck. Mulching teeth inwardly of the ramp produce a mulching action when desired. The combination mower blade has the feature of assisting the filling of a grass catching bag and alternatively has the feature of mulching the mown grass as desired.

10 Claims, 1 Drawing Sheet

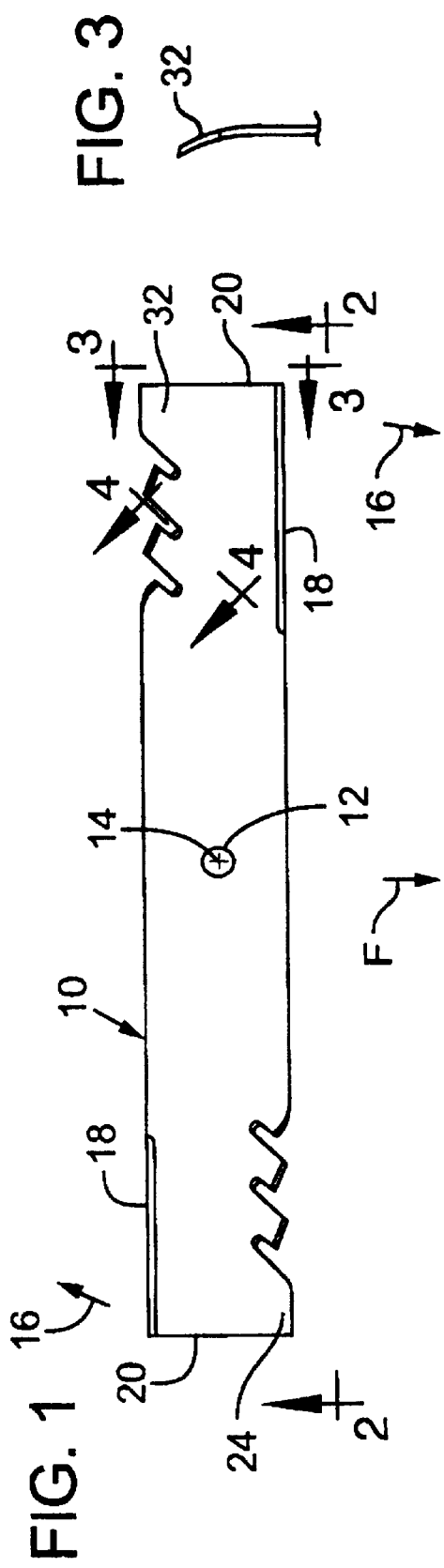
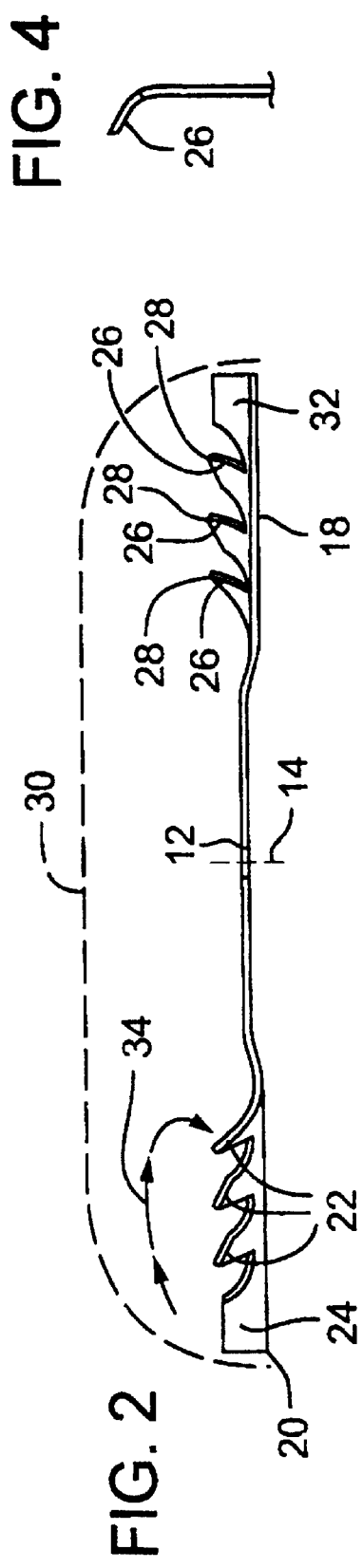

MOWER BLADE

FIELD OF THE INVENTION

This invention relates to rotary mower blades mounted on power mowers used, e.g., for cutting lawns, and more particularly to a rotary mower blade having a combination of auxiliary features that alternatively enhance bag filling, side delivery and mulching.

BACKGROUND OF THE INVENTION

A rotary mower blade is designed to have varying features. The blade itself resembles a flat bar that is rotated about a center axis with opposing blade portions extended from the axis and each blade portion having a leading beveled edge for cutting. It is mounted on a powered mower (riding or walk behind mower). The blade is rapidly rotated about the axis with each blade portion participating in the operation of cutting, e.g., grass of a residential lawn but including any type of grass cutting (golf courses, grounds surrounding industrial and commercial complexes, etc.). Such cutting is the primary feature of the blade.

The mower operator may wish to simply leave the cut grass lay on the lawn for fertilization and to avoid the task of bagging and disposing of the grass. In this event, the operator will prefer that the grass be mulched, i.e., cut into smaller pieces. Mulching is accomplished by providing a set of teeth on the trailing edge of the blade portion. The teeth are projected above the plane of the blade body and the grass that is cut by the leading edge is re-cut by the trailing edge teeth to produce the mulching action.

Alternatively, the mower operator may prefer to cut and bag the mowed grass. Bagging is achieved by taking advantage of the propulsion that is applied to the cut grass when impacted by the blade. The propelled grass is guided through or along a guide way and into a bag that is provided on the mower for that purpose. Still further, the guide way may be provided to simply deliver the grass through a side opening and onto the ground or lawn. The propulsion and guiding of the grass can be enhanced by providing the rear edge of the blade portions with an uplifting ramp that creates an upward air flow that directs the cut grass accordingly.

The problem to which the present invention is addressed is that mulching blades are not a preferred blade type for bagging (or side delivery) and the bagging blades are not suitable for mulching. Yet operators will alternate between bagging and mulching and using current blade designs, a selection has to be made as to blade type and one or the other of the operations is less efficient unless the blade is changed.

BRIEF DESCRIPTION OF THE INVENTION

The present invention is a modification of the mower blade which includes a combination of mulching teeth and ramp portion at the trailing edge. Preferably the trailing edge is provided with a ramp portion at the outer end and cutting teeth inwardly of the ramp portion. The blade continues to produce a mulching action but not at the blade tips. Nevertheless, in a mulching operation the grass is flung around within the blade housing or deck in a swirling-like motion and most or all of the grass is repeatedly cut and re-cut by the mulching teeth before being ejected onto the ground.

The ramped blade tip (although contributing to the swirling action) is primarily intended to enhance the bagging operation. The rapidly rotating ramp portion produces a lifting action to the underlying grass (cut or uncut) and thereby aids the cutting action, and also an upward positive air flow that directs the severed grass toward an opened guide way or tube for side discharge or bagging. The present invention accordingly provides a blade that accomplishes both mulching enhancement and bag filling or side delivery enhancement.

It will be appreciated that the combination blade may be further modified by providing the mulching teeth at the blade tips and the lift ramps inward thereof. However, the preferred embodiment as described previously is deemed to provide the better overall performance. Furthermore, the movement of the mulching teeth inward of the blade tips may also provide added safety. The invention and its various modifications will be further appreciated upon reference to the following detailed description having reference to the accompanying drawings.

DESCRIPTION OF THE DRAWINGS

FIG. 1 is a plan view of a mower blade in accordance with the present invention;

FIG. 2 is a side view as taken on view lines 2—2 of FIG. 1;

FIG. 3 is a section view as taken on view lines 3—3 of FIG. 1; and

FIG. 4 is a section view as taken on view lines 4—4 of FIG. 1.

DETAILED DESCRIPTION

FIG. 1 illustrates a blade 10 of the present invention. The blade 10 has a center mounting hole 12 defining an axis 14 and is designed for rotation in the clockwise direction about the axis 14 as indicated by arrows 16 in FIG. 1. Whereas the blade 10 can have different lengths depending on the type or size of mower, a typical length having a contemplated use, e.g., for a standard sized walk behind mower is about 21 inches. A leading cutting edge 18 is provided which extends from the extreme end 20 (at each end) inward toward the mounting hole 12. In a preferred embodiment, the length of the cutting edge 18 is about 5 inches. It will be appreciated that the blade is rotated about its axis 14 at a sufficiently high rpm that the majority of the initial cutting takes place near the blade ends as the mower is moved forwardly, e.g., in the direction F. The cutting edge 18 may of course be extended or shortened as needed to provide the effective cutting edge length.

Reference is now directed to the configuration of the blade 10 at the trailing edge. As illustrated in FIGS. 1 and 2, the trailing edge includes a cutting teeth portion having cutting teeth 22 and a lift or ramp portion 24, the lift portion 24 being located at the extreme end of the blade. The teeth 22 of the cutting teeth portion are formed by serrating the rear end at an angle inwardly toward the center to form teeth segments, and raising and twisting the resulting teeth segments to present a forwardly directed cutting edge 26 seen most clearly at the right side of FIG. 2. See also FIG. 4.

It is the edges 26 and protruding tips 28 of teeth 22 that produce the mulching action. Grass is initially severed by the cutting edge 18 and it is then re-cut by the edges 26 and tips 28 of the trailing teeth. The non-twisted ramp portion (compare FIGS. 1, 2 and 3) produces an upwardly directed air flow and grass that is cut at the blade tip is directed upwardly but contained within the mower deck 30 (dash line 30 in FIG. 2). If the mower is equipped with a bag and open guide tube leading from the deck 30 to the bag, the air flow encourages or induces movement of the grass into and through the guide tube and into the bag. If the mower is equipped for mulching (the guide tube being closed), the air flow of the ramp induces movement of the grass upwardly and inwardly to be engaged by the teeth 22 for recutting (see arrow 34).

As explained, the dimensions of the different features of the blade may vary. In the preferred embodiment, the blade is 21 inches long. The leading edge portion at the extreme outer end which is beveled to form the primary cutting edge 18 is about 5 inches. Substantially along the same 5 inches at the trailing edge, the outboard 1¼ inches is formed into a ramp starting from about mid way between the leading and trailing edges and angled upwardly at about a 20 degree angle. The remaining about 3¾ inches (at the trailing edge) is formed into three mulching teeth that are curved upwardly and angled from the plane of the blade at an angle of about 60 degrees to achieve the forwardly directed mulching edge 26 and tips 28.

The above-described preferred embodiment is but an example of a product of the invention. For example, it is contemplated that the positions of mulching teeth and lift ramp may be reversed. A similar but different swirling action may be induced (the arrows 34 of FIG. 2 only being a general indicator of such swirling) but nevertheless the grass in being swirled about within the deck 30 will engage and re-engage the mulching teeth at the blade tips. The illustrated embodiment is nevertheless considered preferred and with the potential for improved safety in having the teeth more inwardly contained in the deck. Those skilled in the art will conceive of numerous modifications without departing from the true scope of the invention which is determined from the appended claims. Specifically, it is intended that the claims will not be interpreted as means plus function claims under 35 USC §112, ¶6.

The invention claimed is:

1. A blade for mounting on a rotary mower comprising
   an elongate flat blade defining a plane and having opposed end edges and opposed side edges, said blade adapted for mounting onto a rotary mower for rotation about a center axis extended perpendicular to the plane and separating the blade into opposed elongate end portions extended from said center axis;
   said blade as rotated about said axis defining a leading side edge portion and a trailing side edge portion for each elongate end portion, each of said leading side edge portions formed into a cutting edge extended from the end edge inwardly a determined distance from said end edge;
   said trailing edge of each elongate end portion configured to have a ramp portion and a teeth portion, said teeth portion including a plurality of teeth formed by rearwardly extended segments, each segment raised from the plane of the blade and twisted to present a forwardly directed tooth edge whereby grass cut by the leading cutting edge is re-cut by said teeth in a mulching operation, said ramp portion including an upwardly angled and non-twisted segment of said trailing edge providing a ramping surface for deflecting air and cut grass in an upward direction.

2. A blade as defined in claim 1 wherein said ramp portion is extended from each of said end edges inwardly a second determined distance from said end edges and said teeth portions are proximal to said ramp portion and extended inwardly therefrom a third determined distance.

3. A blade as defined in claim 2 wherein a mounting hole is provided at the blade center and the center of the hole defines the axis of rotation.

4. A blade as defined in claim 2 wherein the teeth are formed and angled in an outward direction from said axis and bent upwardly and inwardly to produce said cutting edges of said teeth to be directed in a forward direction.

5. A blade as defined in claim 4 wherein the teeth are extended upward of said plane at an angle of about 60 degrees.

6. A blade as defined in claim 2 wherein the ramp is extended upward of said plane at an angle of about 20 degrees.

7. A blade as defined in claim 2 wherein said second distance is at least one inch.

8. In combination, a rotary mower housing and a mower blade rotatably mounted to said housing which comprises:
   a rotary mower deck;
   a mower blade rotatably mounted at a center position in the deck and defining opposed blade ends, said deck forming a cover over the blade and defining a peripheral skirt portion, said blade extended from its center mounting to the peripheral skirt portion at each blade end;
   said blade defining a plane and having leading and trailing edges, a cutting edge formed at least on the outermost portion of the leading edge at each blade end whereat grass cutting takes place;
   mulching teeth formed on the trailing edge of the blade and behind the cutting edge for mulching grass severed by said cutting edges, said teeth formed by rearwardly extended segments, each segment raised from the plane of the blade and twisted to present a forwardly directed tooth edge; and
   a ramp portion formed on the trailing edges in proximal relation to said mulching teeth, said ramp portion provided by an upwardly angled and non-twisted segment of said trailing edge.

9. A combination as defined in claim 8 wherein an outermost portion of the blade ends is configured to form the upwardly angled ramp portion at the trailing edge to upwardly direct air flow for assisting bagging of the cut grass and alternately for inducing a swirling action for mulching.

10. A combination as defined in claim 8 wherein the upwardly angled ramp portion extends from an outermost end of the blade inwardly to at least an inch along the blade, said mulching teeth provided inwardly and proximal to said ramp portion.

* * * * *